United States Patent
Lammering et al.

(10) Patent No.: US 8,954,185 B2
(45) Date of Patent: Feb. 10, 2015

(54) CUT OPTIMIZATION SYSTEM AND METHOD

(75) Inventors: Brian Lammering, Thousand Oaks, CA (US); Robert Weston, Thousand Oaks, CA (US); Kurt P. Zierhut, Camarillo, CA (US); Wayne Reilly, Simi Valley, CA (US)

(73) Assignee: Haas Automation, Inc., Oxnard, CA (US)

( * ) Notice: Subject to any disclaimer, the term of this patent is extended or adjusted under 35 U.S.C. 154(b) by 1292 days.

(21) Appl. No.: 12/409,418

(22) Filed: Mar. 23, 2009

(65) Prior Publication Data

US 2009/0248194 A1  Oct. 1, 2009

Related U.S. Application Data

(60) Provisional application No. 61/039,745, filed on Mar. 26, 2008.

(51) Int. Cl.
*G05B 13/02* (2006.01)
*G05B 19/416* (2006.01)

(52) U.S. Cl.
CPC .. *G05B 19/4163* (2013.01); *G05B 2219/41115* (2013.01); *G05B 2219/41256* (2013.01); *G05B 2219/45044* (2013.01)
USPC .......................................... 700/173; 700/180

(58) Field of Classification Search
None
See application file for complete search history.

(56) References Cited

U.S. PATENT DOCUMENTS

| | | | |
|---|---|---|---|
| 3,504,581 A | 4/1970 | Weichbrodt et al. | |
| 3,550,107 A | 12/1970 | Thomson et al. | |
| 4,636,780 A | 1/1987 | Thomas et al. | |
| 5,170,358 A | 12/1992 | Delio | |
| 5,854,994 A * | 12/1998 | Canada et al. | 702/56 |
| 6,085,121 A * | 7/2000 | Stern | 700/175 |
| 6,859,540 B1 * | 2/2005 | Takenaka | 381/94.3 |
| 6,957,121 B2 * | 10/2005 | Lottgen et al. | 700/180 |
| 6,993,410 B2 * | 1/2006 | Esterling | 700/177 |
| 7,536,237 B2 * | 5/2009 | Esterling | 700/175 |
| 7,712,373 B2 * | 5/2010 | Nagle et al. | 73/780 |
| 2008/0000304 A1 * | 1/2008 | Nagle et al. | 73/780 |
| 2008/0058982 A1 * | 3/2008 | Gray | 700/159 |
| 2008/0281462 A1 * | 11/2008 | Suh et al. | 700/181 |

OTHER PUBLICATIONS

Al-Regib, Ni, and Lee, "Programming Spindle Speed Variation for Machine Tool Chatter Suppression", International Journal of Machine Tools & Manufacture, vol. 43, 2003, pp. 1229-1240.*

(Continued)

*Primary Examiner* — Kakali Chaki
*Assistant Examiner* — Walter Hanchak
(74) *Attorney, Agent, or Firm* — McDermott Will & Emery LLP

(57) ABSTRACT

A cut optimization system controls chatter in a machine tool during a cutting operation. A microphone is configured to capture acoustic noise emitted by the machine tool during the cutting operation and to generate an AC signal corresponding to the captured acoustic noise. A filter is configured to attenuate frequencies of the AC signal outside of a frequency band and a rectifier is configured to rectify the filtered AC signal into a DC component. A controller is configured to compare the DC component with a threshold value and, if the DC component is greater than the threshold, cyclically vary the rotational speed of a spindle in the machine tool from a commanded speed.

25 Claims, 4 Drawing Sheets

(56) References Cited

OTHER PUBLICATIONS

Ghosh, Ravi, Patra, Mukhopadhyay, Paul, Mohanty, Chattopadhyay, "Estimation of Tool Wear During CNC Milling Using Neural Network-based Sensor Fusion", Mechanical Systems and Signal Processing, vol. 21, 2007, pp. 466-479.*

Bacharowski, Walter, "Machinery Monitoring," Signal Path Designer$^{SM}$, No. 104, pp. 1-8 (2006).

Lennous, Paul, "Measuring Vibration Accurately," National Instruments™ NI Week™ (Aug. 17, 2000).

* cited by examiner

CUT OPTIMIZATION SYSTEM AND METHOD

This application claims the benefit of U.S. Provisional Application No. 61/039,745, filed on Mar. 26, 2008, which is hereby incorporated herein by reference.

FIELD

The invention relates to machine tools and, in particular, concerns a cut optimization system and method for controlling chatter in a machine tool.

BACKGROUND

Computer numerical control ("CNC") machine tools use a computer control system to control the operation of a machine tool. An operator selects a user program containing a sequence of instructions that is executed by the control system to operate the machine tool in a desired manner. Each instruction directs the machine tool to perform an action such as selecting a cutting tool, positioning the cutting tool and/or a work piece, setting a spindle rotational speed and/or a feed rate for the cutting tool, and performing one or more cuts on the work piece with the cutting tool. Using stored sequences of instructions, CNC machine tools perform complex machining of the work piece with minimal human interaction. By shifting operation of the machine tool from a manual operation performed by a machinist to a computer controlled operation, complex machining tasks become repeatable with minimal variation between finished parts.

While cutting a work piece, undesirable vibrations may occur between the work piece and the cutting tool. These undesirable vibrations, or chatter, may occur in a CNC machine tool due to a dull cutting tool, incorrect feed/speed matching between the cutting tool and the work piece, or a combination of these factors. If chatter is allowed to occur during a cutting process, the life of the cutting tool may be unnecessarily reduced and/or the machined part may have to be discarded due to a bad cut or a poor surface finish. These negative consequences lead to additional time and increased costs required to produced machined parts, thereby negating many of the efficiencies gained by using a CNC machine tool.

SUMMARY

A cut optimization system and method is described herein that detects chatter in a machine tool, such as a mill or a lathe, and invokes corrective measures to stop the chatter during a cutting operation. The cut optimization system monitors acoustic signals being emitted from the machine tool during the cutting operation and produces a signal corresponding to the emitted sound level. When the produced signal reaches a pre-determined threshold, a corrective measure is automatically turned on for the remainder of the cutting process.

According to one embodiment, a cut optimization system controls chatter in a machine tool during a cutting operation. A microphone is configured to capture acoustic noise emitted by the machine tool during the cutting operation and to generate an AC signal corresponding to the captured acoustic noise. A filter is configured to attenuate frequencies of the AC signal outside of a frequency band and a rectifier is configured to rectify the filtered AC signal into a DC component. A controller is configured to compare the DC component with a threshold value and, if the DC component is greater than the threshold, cyclically vary the rotational speed of a spindle in the machine tool from a commanded speed.

According to another embodiment, a method for controlling chatter in a machine tool includes capturing acoustic noise generated by the machine tool with a microphone and generating an AC signal corresponding to the captured acoustic noise. The AC signal is filtered to attenuate frequencies outside of a frequency band and rectified into a DC component. The DC component is compared with a threshold value and, if the DC component is greater than the threshold value, a rotational speed of a spindle in the machine tool is cyclically varied from a commanded speed.

According to another embodiment, a computer-readable medium containing computer-executable instructions for performing a method for controlling chatter in a machine tool is provided. The method includes capturing acoustic noise generated by the machine tool with a microphone and generating an AC signal corresponding to the captured acoustic noise. The AC signal is filtered to attenuate frequencies outside of a frequency band and rectified into a DC component. The DC component is compared with a threshold value and, if the DC component is greater than the threshold value, a rotational speed of a spindle in the machine tool is cyclically varied from a commanded speed.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION

The detailed description set forth below in connection with the associated drawings is intended as a description of various embodiments of the invention and is not intended to represent the only embodiments in which the invention may be practiced. The detailed description includes specific details for the purpose of providing a thorough understanding of various embodiments of the invention. However, it will be apparent to those skilled in the art that the invention may be practiced without all of the specific details contained herein. In some instances, well known structures and components are described in general and may be shown in block diagram form in order to avoid obscuring the concepts of the invention.

Figure 1:
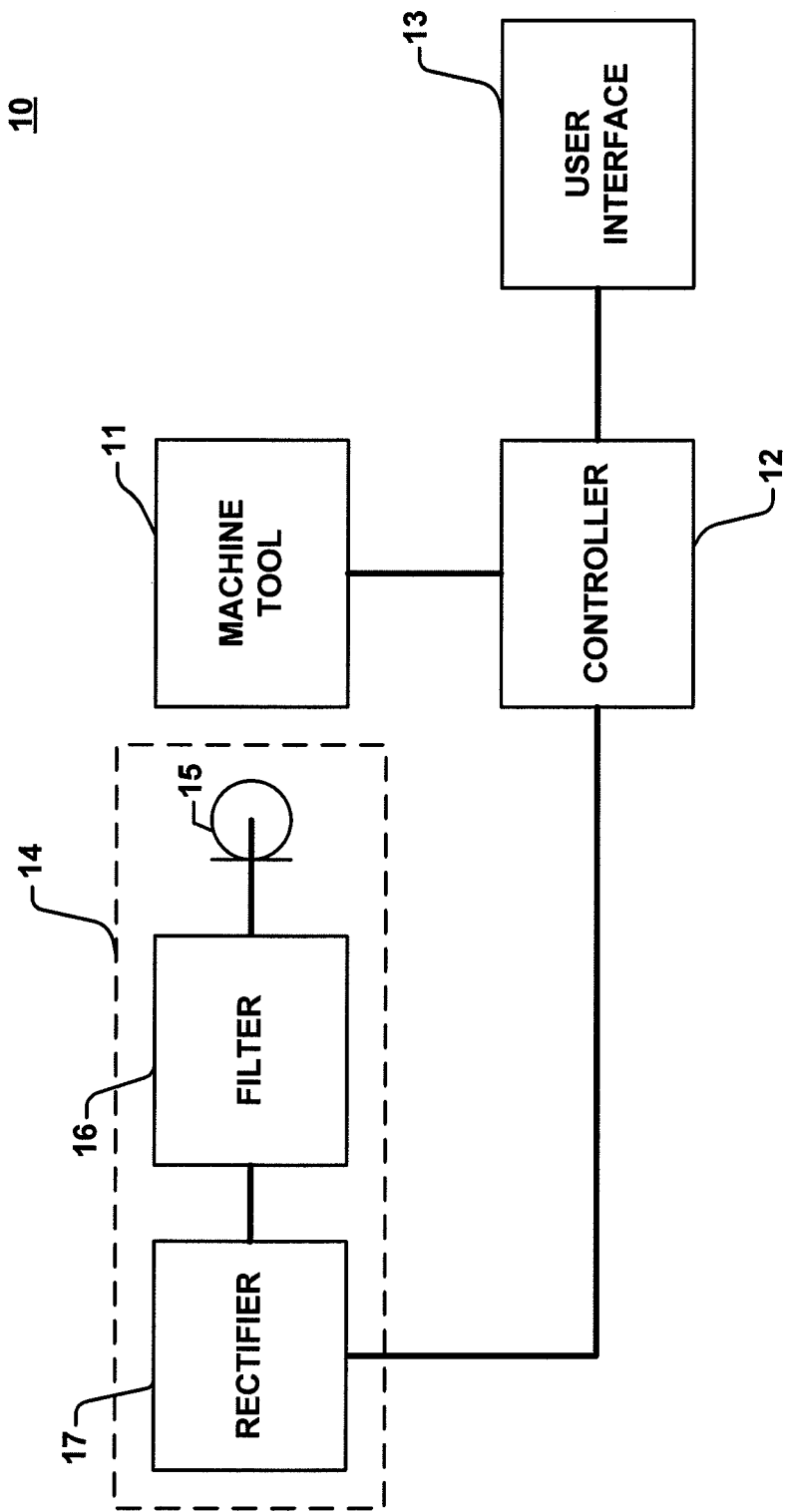
FIG. 1 is a block diagram depicting components of a CNC machine tool with a cut optimization system according to one embodiment.

FIG. 1 is a block diagram depicting components of a CNC machine tool 10 with a cut optimization system according to one embodiment. As depicted in FIG. 1, CNC machine tool 10 includes machine tool 11, controller 12 and user interface 13. CNC machine tool 10 further includes detection stage 14, comprised of microphone 15, filter 16 and rectifier 17. Machine tool 11 processes a work piece in accordance with control signals and commands received from controller 12. Controller 12 monitors and controls the operation of machine tool 11 based on code executed within controller 12 and/or input received from an operator via user interface 13. User interface 13 allows an operator to monitor and control the operation of CNC machine tool 10.

Machine tool 11 represents a mechanical system used to shape and finish a work piece into a machined part using one or more cutting tools. Work pieces may be made of various types of materials including metals, metal alloys, woods and plastics. Machine tool 11 includes a spindle that is rotated by an electric motor or some other controllable drive mechanism. The spindle may be coupled directly to the electric motor or may be driven by the electric motor via an arrangement of belts and/or gears. The spindle may hold a cutting tool which, when rotated, is used to remove material from a work piece, such as in a vertical machining center, a horizontal machining center or a multi-axis machining center. Alternatively, the spindle may hold and rotate a work piece while material is removed from the work piece using a cutting tool, such as in a turning center or a lathe. The work piece and the cutting tool may be positioned using motors, actuators, servos and/or other mechanisms known to those skilled in the art.

Controller 12 is communicatively coupled to machine tool 11 and monitors and controls the operation of machine tool 11. For example, controller 12 monitors and controls the relative positions of a work piece and a cutting tool, the rate at which these relative positions are changed, and the rotational speed of a spindle to which either the work piece or the cutting tool is attached. By setting the rotational speed of the spindle and changing the relative positions of the work piece and the cutting tool, controller 12 causes material to be removed from the work piece. The communication of control and monitor signals between machine tool 11 and controller 12 may be performed using any of a number of communication protocols and interfaces known to those skilled in the art.

The control signals and commands communicated by controller 12 to machine tool 11 are generated based on code executed by one or more processors within controller 12. The executed code includes instructions from an operating system and a user program. The operating system includes code for controlling the overall functionality of CNC machine tool 10. For example, the operating system includes code for initiating operation of CNC machine tool 10 at power-on or reset conditions. The operating system also includes code for facilitating communication between components within CNC machine tool 10 and for managing computing resources (processor time, memory access, etc.) of CNC machine tool 10. The operating system also includes code for executing one or more user programs.

A user program includes instructions for performing a sequential process using machine tool 11 to shape a work piece into a desired form. The sequential process includes steps for selecting and mounting a cutting tool, positioning the cutting tool, positioning the work piece, moving/operating the cutting tool relative to the work piece, moving/rotating the work piece relative to the cutting tool, etc. According to one embodiment of the invention, the user program is created by an operator using G-code instructions. In alternative embodiments, the user program may be created automatically using software packages executed on a computer and also may be created using other formats besides G-code.

User interface 13 includes a display for displaying information to an operator and one or more input devices for receiving user input from an operator. The display may be implemented using a CRT monitor, an LCD monitor, or any other type of display device known to those skilled in the art. The input devices may be implemented using a pointing device, such as a mouse or joystick, a jog handle, one or more keys, which may be soft keys are hardwired keys, a touch-screen display device, or any combination of these types of devices. Those skilled in the art will recognize that user interface 13 may be implemented using any type of device or devices that allow an operator to view and select operating parameters of CNC machine tool 10 and to input commands for controlling the operation of CNC machine tool 10.

As noted above, user interface 13 allows an operator to control and monitor the operation of CNC machine tool 10. In particular, user interface 13 allows the operator to power-up or power-down the system, reset the system, select parameters unique to a specific CNC machine tool 10, enter a new user program, select from multiple existing user programs, monitor the position of the cutting tool, monitor the position of the workpiece, select positions for the cutting tool and/or the workpiece, select axes of movement for the cutting tool and/or the workpiece, enter individual instructions for operating machine tool 11, step through and troubleshoot user programs, etc. It is to be understood that the foregoing operations are intended to be examples and not to limit the scope of the invention. One skilled in the art will recognize other operations performed via user interface 13 of CNC machine tool 10.

Figure 2:
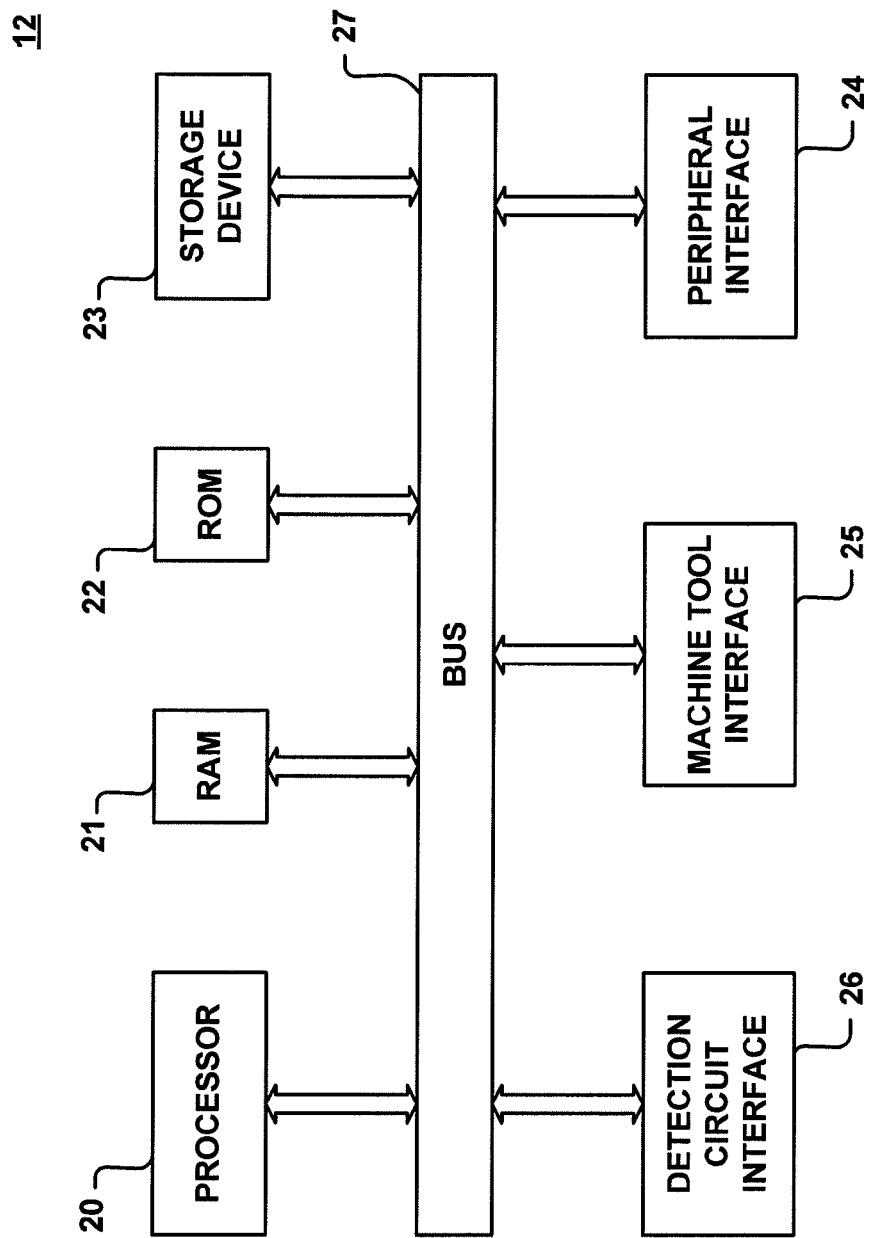
FIG. 2 is a block diagram depicting components of a controller of a CNC machine tool according to one embodiment.

FIG. 2 is a block diagram depicting components of controller 12 according to one embodiment. As depicted in FIG. 2, controller 12 includes processor 20, RAM 21, ROM 22, storage device 23. Controller 12 further includes peripheral interface 24, machine tool interface 25 and detection circuit interface 26. The components of controller 12 are interconnected and communicate data and commands via bus 27.

Processor 20 is configured to execute sequences of instructions or code to implement an operating system that manages the resources of controller 12 and facilitates communication between controller 12 and machine tool 11 and detection stage 14. Processor 20 is further configured to execute sequences of instructions or code from one or more user programs, which include step-by-step instructions programmed by an operator to control machine tool 11 to shape a work piece into a machined product. Processor 20 is also configured to execute sequences of instructions or code to implement the correction stage of a cut optimization system in CNC machine tool 10.

Processor 20 may be a general-purpose microprocessor, a microcontroller, a Digital Signal Processor ("DSP"), an Application Specific Integrated Circuit ("ASIC"), a Field Programmable Gate Array ("FPGA"), a Programmable Logic Device ("PLD"), a controller, a state machine, gated logic, discrete hardware components, or any other suitable component(s) that can perform calculations or other manipulations of information necessary to execute sequences of instructions. While FIG. 2 depicts a single processor 20 in controller 12, one skilled in the art will recognize that multiple processors may be used to implement controller 12.

ROM 22 is a non-volatile memory (e.g., PROM, EPROM, EEPROM, etc.) that stores static instruction sequences or code such as a basic input/output system ("BIOS") executed by processor 20 at start-up to initiate operation of controller 12. RAM 21 is a volatile memory (e.g., SRAM, DRAM, etc.) that temporarily stores data and instruction sequences or code for execution by processor 20. Storage device 23 represents a non-volatile storage device for storing data and instruction sequences or code. Storage device 23 may include magnetic media (e.g., floppy disks, hard disks, magnetic tape, etc.), optical media (e.g., CD, DVD, etc.) or electronic media (e.g., Flash memory, PROM, EPROM, EEPROM, etc.). Each of these types of memories and storage devices represents an example of computer-readable media that is suitable for storing computer-executable instructions. The operating system, user programs and code for the correction stage referred to above may be stored in one or more of these storage devices for execution by processor 20.

Peripheral interface 24 represents one or more interfaces configured to communicate data and commands between an operator, via user interface 13, and controller 12. Peripheral interface 24 may include one or more serial and/or parallel ports for coupling to a display and one or more input devices of user interface 13. Peripheral interface 24 also may include wireless interfaces (e.g., Bluetooth, IEEE 802.11x, etc.) configured to couple to one or more peripheral devices, including user interface 13. Those skilled in the art will recognize other types of interfaces capable of communicating data and commands between user interface 13 and controller 12.

Machine tool interface 25 facilitates the communication of information and control signals and commands between controller 12 and machine tool 11 using one or more buses. For example, information on the status of various components in machine tool 11 may be communicated to controller 12 and displayed via user interface 13 for an operator or for use in the operating system or user programs. Additionally, controller 12 may send control signals to components in machine tool 11 during execution of the operating system, user programs and during operation of the correction stage. Those skilled in the art will recognize the various types of buses suitable for communicating information and control signals and commands between controller 12 and machine tool 11.

Detection circuit interface 26 is configured to receive a detection signal from detection stage 14 for processing by controller 12. According to one embodiment, detection circuit interface 26 may include an analog-to-digital converter coupled to detection stage 14 and configured to sample a voltage of the detection signal provided by detection stage 14 in accordance with the correction stage executed by controller 12. A more detailed explanation of the operation of detection stage 14 and the correction stage executed by controller 12 is provided below.

As represented in FIG. 2, the components of controller 12 are coupled to bus 27. Bus 27 represents one or more buses for communicating data and instructions between the components of controller 12. Controller 12 is not limited to a configuration in which all components are coupled directly to a single bus. Alternative arrangements may include multiple buses linked by other components. It is further noted that controller 12 may include other components besides those depicted in FIG. 2. For example, controller 12 may include a network interface for coupling controller 12 to an external network. In addition, controller 12 may include multiple instances of one or more of the components depicted in FIG. 2.

Returning to FIG. 1, detection stage 14 includes three main components: microphone 15, filter 16 and rectifier 17. Briefly, detection stage 14 captures acoustic signals emitted by machine tool 11 while performing a cutting operation on a work piece, filters and amplifies AC signals corresponding to the captured acoustic signals, and rectifies the filtered AC signals into a DC component representing the acoustic energy emitted by machine tool 11 during the cutting operation. Detection stage 14 provides the DC component for processing in a correction stage in controller 12.

When machine tool 11 is performing a clean cut on a work piece, the acoustic emissions of machine tool 11 are generally limited to frequencies from the rotational speed of the spindle and tooth cutting. When chatter is introduced into the system, multiple harmonics can be heard and the total summation of acoustic energy emitted by machine tool 11 is increased. Microphone 14 may be implemented using a microphone having a wide frequency response including the range of acoustic signals expected to be emitted by machine tool 11 during a cutting operation with and without chatter (e.g., 200 Hz to 10 kHz) and large sensitivity (e.g., −47 dB to −35 dB). According to one embodiment, microphone 14 is implemented using an omni-directional condenser microphone having pin-type mounting configured to be mounted on a printed circuit board with other components of detection stage 14. Those skilled in the art will recognize other types of microphones that may be used to implement microphone 14.

The use of a microphone in detection stage 14 provides significant advantages over more sophisticated solutions currently being employed in the industry to detect chatter during cutting operations in a machine tool. For example, accelerometers and potentiometers are generally more expensive and are significantly more difficult to correctly mount within the machine tool. Furthermore, accelerometers and potentiometers have limited life spans in these applications. Microphones, on the other hand, provide a relatively inexpensive capture device with greater flexibility for mounting within the machine tool. For example, microphone 14 may be positioned adjacent to the casing to which the spindle is mounted without requiring direct contact with the casing or a specific position of the microphone with respect to the casing. The increased flexibility in mounting options allows a microphone to be positioned farther away from the cutting point between the cutting tool and the work piece. This helps prevent contamination and destruction of the microphone by waste materials generated during the cutting operation.

The acoustic signals produced by microphone 14 are typically weak and may contain unwanted frequencies due to noise. Filter 16 is configured to filter and amplify the AC acoustic signal captured by microphone 14. In particular, filter 16 is configured to pass and amplify frequencies that are monitored for chatter detection and attenuate unwanted frequencies outside of a desired frequency band. Preferably, filter 16 is configured to have a large gain, a flat passband and a steep rolloff after the cutoff frequency. According to one embodiment, filter 16 is implemented using a Butterworth low pass filter with a cutoff of 10 kHz to pass a frequency band of frequency less than 10 kHz. The Butterworth filter provides maximum pass band flatness, thereby minimizing the problem of certain signals in the pass band being amplified or attenuated more than other signals in the pass band.

Rectifier 17 is configured to rectify the AC acoustic signal that is filtered and amplified by filter 16 into a DC component. The rectified DC component is used to express the overall acoustic energy being emitted by machine tool 11 during a cutting operation. The use of a DC component provides a relatively simple measuring stick to monitor a cutting operation for chatter compared to solutions which analyze data in the frequency domain and therefore require more sophisticated processing and incur the associated delays and expense. Rectifier 17 may be implemented using a small signal fast switching diode, such as a common Schottky diode. Rectifier 17 may be implemented as a half-wave rectifier or a full-wave rectifier. Those skilled in the art will recognize various configurations of rectifier 17 suitable for use in detection stage 14.

Figure 3:
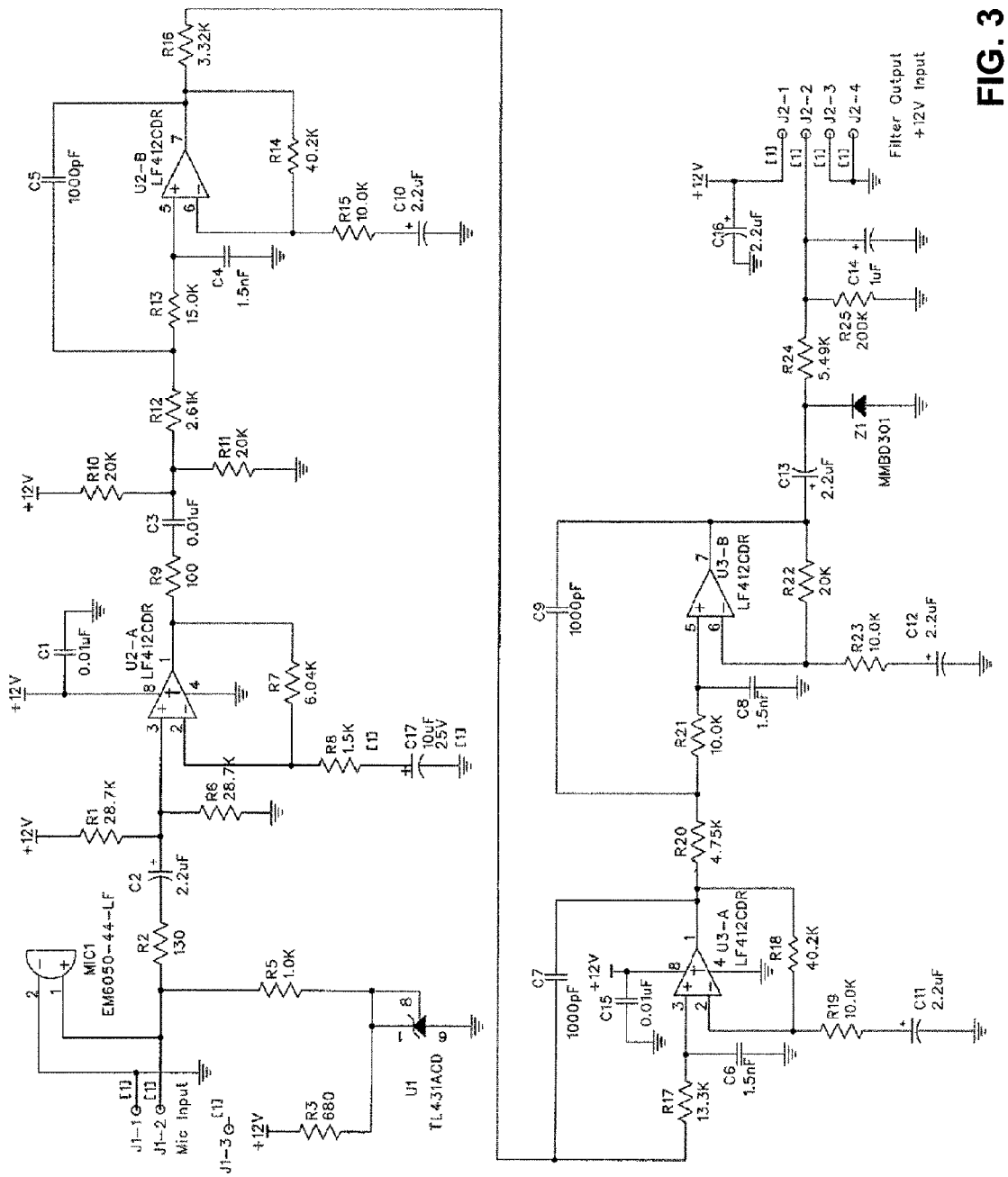
FIG. 3 is a schematic diagram depicting a circuit for a detection stage of a cut optimization system according to one embodiment.

FIG. 3 is a schematic diagram depicting a layout for detection stage 14 according to one embodiment. As shown in FIG. 3, detection stage 14 is implemented using a microphone, a Sallen-Key input stage followed by a three stage Sallen-Key, Butterworth low pass filter and an output stage for rectifying and outputting a DC component to controller 12. The Sallen-Key, Butterworth low pass filter depicted in FIG. 3 is a three-stage, six-pole filter having a cut-off of 10 kHz with a roll-off of −120 dB per decade. The three stages are configured to have gains of five, five and four, respectively, for a total gain of 100.

Detection stage 14 may be assembled using discrete components for each of the circuit elements mounted on a printed circuit board. Alternatively, the circuit elements depicted in FIG. 3 may be grouped and integrated into one more chips, which are mounted on a printed circuit board. The relatively simple detection stage 14 provides a cost effective solution that can be easily manufactured and, even using discrete components, can be assembled into a relative small package. Those skilled in the art will recognize that the circuit shown in FIG. 3 represents only one example of a suitable detection stage 14 and that other configurations and combinations of components may be used to implement detection stage 14 without departing from the scope of the invention.

Figure 4:
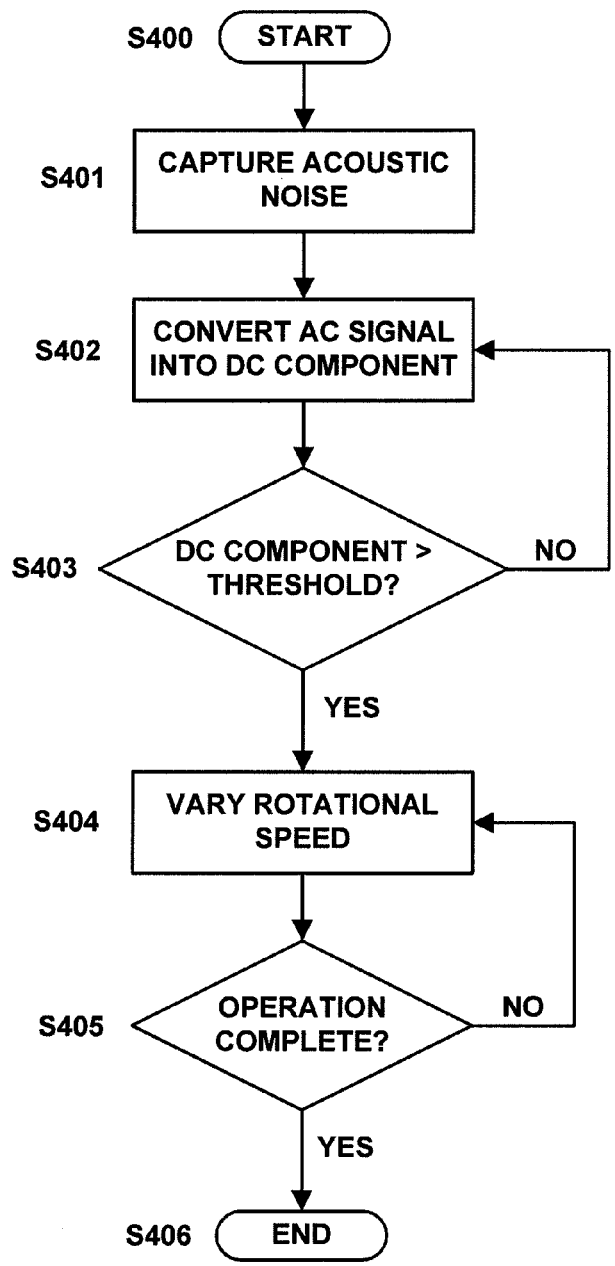
FIG. 4 is a flowchart depicting steps in a method for controlling chatter in a machine tool according to one embodiment.

FIG. 4 is a flowchart depicting steps in a method for controlling chatter in a CNC machine tool according to one embodiment. Briefly, during a cutting operation acoustic noise emitted by machine tool 11 is captured and converted into a DC component. The DC component is compared against a threshold value and, if the DC component is greater than the threshold value, the rotational speed of the spindle is cyclically varied from a commanded speed for the duration of the cutting operation. Each of these steps is described in more detail below.

In step S400, the detection stage and the correction stage of the cut optimization system are initialized. Specifically, power is supplied to the detection stage circuit and the instructions or code corresponding to the correction stage are retrieved from a computer-readable medium, such as storage device 23 or ROM 22, and loaded for execution by processor 20 in controller 12. This initialization may occur when CNC machine tool 10 is powered up and the operating system is loaded for execution. Alternatively, this initialization may occur just prior to a cutting operation being performed on a work piece. In other alternative embodiments, the initialization of the detection stage and the correction stage may occur at different times. For example, power may always be supplied to the detection stage when CNC machine tool 10 is powered up and the correction stage code may be loaded and executed only when a cutting operation is going to be performed to preserve processing power of controller 12.

In step S401, the acoustic noise emitted by machine tool 11 during a cutting operation is captured by microphone 14. Microphone 14 outputs an AC signal corresponding to the captured acoustic noise. The AC signal is processed by filter 16 and rectifier 17 in the manner described above to produce a DC component in step S402. The DC component is provided by detection stage 14 to controller 12 via detection circuit interface 26.

In step S403, controller 12 compares the DC component against a threshold value. According to one embodiment, controller 12 converts the DC component supplied by detection stage 14 into a digital value using an analog to digital converter. This digital value is compared against the threshold value stored within controller 12. The threshold value may be selected by an operator via user interface 13 from a predetermined list of threshold values that have been determined beforehand to avoid chatter for different combinations of cutting operation, work piece material, cutting tool, etc. The predetermined list may be loaded and stored in storage device 23 or ROM 22 of controller 12 by the manufacturer or an operator.

Alternatively, the threshold value may be set by an operator during the initialization step S400. According to one embodiment, user interface 13 of CNC machine tool 10 displays the DC component, which represents the continuous chatter/energy output of machine tool 11. User interface 13 may also allow an operator to specify a threshold value, which represents a maximum allowable chatter/energy output expected during a program cutting operation executed by CNC machine tool 10. The maximum allowable chatter/energy output, or threshold value, is typically set by an experienced machinist who determines a maximum allowable amount of chatter/energy output (i.e., acoustic energy) for a specific cutting operation based on experience and trial-and-error experimentation. The threshold value, or maximum allowable amount of acoustic energy, may be determined by running the cutting operation without chatter and noting the maximum DC component value (i.e., chatter/energy) that is captured by detection stage 14. The maximum value is stored by controller 12 as the threshold value for the particular type of cutting operation during which it was obtained.

The ability to set the chatter acoustic threshold value allows an operator to define the extent of chatter correction to use in a cutting operation. For example, a low threshold value will activate the chatter correction measures often, and a high threshold value will activate the chatter correction measures only during cuts that produce large amounts of vibration and chatter.

If the DC component is not greater than the threshold value, the process returns to step S402 where the current DC component supplied by detection stage 14 is converted into a digital value and compared against the threshold value in step S403. This comparison loop continues until either the DC component is determined to be greater than the threshold value or the cutting operation concludes.

If the DC component is determined to be greater than the threshold value, the process proceeds to step S404 where a corrective measure of varying the rotational speed of the spindle in machine tool 11 is activated by the correction stage in controller 12. According to one embodiment, a spindle speed variation measure is invoked by the correction stage in controller 12 to alter the rotational speed of the spindle commanded by controller 12 by a designated percentage around the commanded speed at a designated rate. The percentage change and rate of change may be parameters selected or programmed by an operator via user interface 13 during the initialization of the cut optimization system in step S400. These parameters may be selected from a predetermined list stored in controller 12 by the manufacturer or an operator for different combinations of cutting operations, work piece material, cutting tool, etc. Alternatively, an operator may select the parameters based on experience and trial-and-error experimentation. According to one embodiment, the corrective measure cyclically varies the rotational speed of the spindle within a range of 0.5 to 2.5% of the rotational speed initially commanded by controller 12 for the cutting operation. For example, the rpm of the spindle may be varied +/−20 rpm from a commanded rotational spindle speed of 4000 rpm. According to one embodiment, this cyclical variation occurs every 3 seconds. However, the operation of the cut optimization system is not limited to this rate of change and may use rates slower or quicker than 3 seconds in other embodiments.

As shown in step S405, the rotational speed of the spindle is varied until the cutting operation is complete. Once the cutting operation is complete, the process concludes with step S406 where the correction stage in controller 12 stops the corrective measure of cyclically varying the rotational speed of the spindle in machine tool 11. In step S406, detection stage 14 may be powered down and the execution of the code for the correction stage may be halted until another cutting operation is performed. Alternatively, detection stage 14 and the correction stage may be left operational until CNC machine tool 10 is powered down.

Using an acoustic pick up such as a microphone simplifies mounting the pick up in machine tool 11 compared to what is required when installing other devices such as an accelerometer or a potentiometer. Using a DC component as a representative value of the acoustic energy being emitted by machine tool 11 simplifies the processing required to implement the cut optimization system compared to system that require advance processing capabilities to detect chatter in an acoustic signal in the frequency domain.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "embodiment" does not imply that such embodiment is essential to the subject technology or that such embodiment applies to all configurations of the subject technology. A disclosure relating to an embodiment may apply to all configurations, or one or more configurations. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The examples described herein are intended to simply serve as an example or illustration. Any aspect or design described herein as an example is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A cut optimization system for controlling chatter in a machine tool, the system comprising:
    a microphone configured to capture acoustic noise emitted by a machine tool and to generate an AC signal corresponding to the captured acoustic noise;
    a filter configured to attenuate frequencies of the AC signal outside of a frequency band;
    a rectifier configured to rectify the filtered AC signal into a DC component; and
    a controller configured to:
        compare the DC component with a threshold value; and
        if the DC component is greater than the threshold value, cyclically vary a rotational speed of a spindle in the machine tool from a commanded speed.

2. The cut optimization system according to claim 1, wherein the filter is a low-pass filter.

3. The cut optimization system according to claim 2, wherein the filter is a Sallen-Key, Butterworth low-pass filter.

4. The cut optimization system according to claim 1, wherein the frequency band comprises frequencies less than or equal to 10 kHz.

5. The cut optimization system according to claim 1, wherein the rectifier is a half-wave rectifier.

6. The cut optimization system according to claim 1, further comprising a user interface coupled to the controller, wherein the controller is further configured to:
    display the DC component on the user interface; and
    receive user input via the user interface.

7. The cut optimization system according to claim 6, wherein the user input comprises the threshold value.

8. The cut optimization system according to claim 6, wherein the user input comprises a percentage of the commanded speed by which the rotational speed is cyclically varied from the commanded speed when the DC component is greater than the threshold value.

9. The cut optimization system according to claim 6, wherein the user input comprises a change value by which the rotational speed is cyclically varied from the commanded speed when the DC component is greater than the threshold value.

10. The cut optimization system according to claim 6, wherein the user input comprises a rate at which the rotational speed is cyclically varied from the commanded speed when the DC component is greater than the threshold value.

11. A method for controlling chatter in a machine tool, the method comprising:
    capturing acoustic noise generated by a machine tool with a microphone and generating an AC signal corresponding to the captured acoustic noise;

filtering the AC signal to attenuate frequencies outside of a frequency band;
rectifying the filtered AC signal into a DC component;
comparing the DC component with a threshold value; and
if the DC component is greater than the threshold value, cyclically varying a rotational speed of a spindle in the machine tool from a commanded speed.

12. The method according to claim 11, wherein the filtering step comprises low-pass filtering the AC signal.

13. The method according to claim 11, wherein the frequency band comprises frequencies less than or equal to 10 kHz.

14. The method according to claim 11, wherein the rectifying step comprises half-wave rectifying the AC signal.

15. The method according to claim 11, further comprising:
displaying the DC component on a user interface; and
receiving user input via the user interface.

16. The method according to claim 15, wherein the user input comprises the threshold value.

17. The method according to claim 15, wherein the user input comprises a percentage of the commanded speed by which the rotational speed is cyclically varied from the commanded speed when the DC component is greater than the threshold value.

18. The method according to claim 15, wherein the user input comprises a change value by which the rotational speed is cyclically varied from the commanded speed when the DC component is greater than the threshold value.

19. The method according to claim 15, wherein the user input comprises a rate at which the rotational speed is cyclically varied from the commanded speed when the DC component is greater than the threshold value.

20. A non-transitory computer-readable storage medium containing computer-executable instructions for performing a method for controlling chatter in a machine tool, the method comprising:
comparing a DC component with a threshold value, wherein the DC component comprises a filtered and rectified AC signal corresponding to acoustic noise emitted by a machine tool and captured by a microphone;
if the DC component is greater than the threshold value, cyclically varying a rotational speed of a spindle in the machine tool from a commanded speed.

21. The non-transitory computer-readable storage medium according to claim 20, wherein the method further comprises:
displaying the DC component on a user interface; and
receiving user input via the user interface.

22. The non-transitory computer-readable storage medium according to claim 21, wherein the user input comprises the threshold value.

23. The non-transitory computer-readable storage medium according to claim 21, wherein the user input comprises a percentage of the commanded speed by which the rotational speed is cyclically varied from the commanded speed when the DC component is greater than the threshold value.

24. The non-transitory computer-readable storage medium according to claim 21, wherein the user input comprises a change value by which the rotational speed is cyclically varied from the commanded speed when the DC component is greater than the threshold value.

25. The non-transitory computer-readable storage medium according to claim 21, wherein the user input comprises a rate at which the rotational speed is cyclically varied from the commanded speed when the DC component is greater than the threshold value.

* * * * *